(12) United States Patent
Nagai et al.

(10) Patent No.: US 9,947,464 B2
(45) Date of Patent: Apr. 17, 2018

(54) METHOD OF MANUFACTURING LAMINATED CORE

(75) Inventors: Akira Nagai, Fukuoka (JP); Go Kato, Fukuoka (JP); Kohei Yoshida, Fukuoka (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 248 days.

(21) Appl. No.: 13/885,050

(22) PCT Filed: Oct. 28, 2011

(86) PCT No.: PCT/JP2011/074972
§ 371 (c)(1),
(2), (4) Date: May 13, 2013

(87) PCT Pub. No.: WO2012/081316
PCT Pub. Date: Jun. 21, 2012

(65) Prior Publication Data
US 2013/0234363 A1    Sep. 12, 2013

(30) Foreign Application Priority Data

Dec. 14, 2010 (JP) .................................. 2010-278335

(51) Int. Cl.
*H02K 15/03* (2006.01)
*H01F 41/02* (2006.01)
*H02K 1/27* (2006.01)

(52) U.S. Cl.
CPC .............. *H01F 41/02* (2013.01); *H02K 15/03* (2013.01); *H02K 1/2766* (2013.01)

(58) Field of Classification Search
CPC .......... H02K 21/22; H02K 21/14; H02K 1/04; H02K 2201/06; H02K 2201/15;
(Continued)

(56) References Cited

U.S. PATENT DOCUMENTS

| 4,312,119 A | 1/1982 | Perucchi et al. |
| 4,315,173 A | 2/1982 | Calfo et al. |

(Continued)

FOREIGN PATENT DOCUMENTS

| CN | 101356711 A | 1/2009 |
| CN | 101390273 A | 3/2009 |

(Continued)

OTHER PUBLICATIONS

Office Action dated Aug. 5, 2014, issued in corresponding Japanese Patent Application No. 2012-171366 (2 pages).

(Continued)

*Primary Examiner* — Jeff Wollschlager
*Assistant Examiner* — Armand Melendez
(74) *Attorney, Agent, or Firm* — Westerman, Hattori, Daniels & Adrian, LLP

(57) ABSTRACT

In a method of manufacturing a laminated core, a laminated core body 14 including magnet insertion holes 12 and 13 with magnet pieces 15 inserted therein is placed between a molding (upper) die 10 and a retaining (lower) die 11, and a molding resin 19 is filled from resin reservoir portions (pots) 16 to fix the pieces 15 in the holes 12 and 13. Between the die 10 and the body 14, a guide member 18 is placed, which includes resin passages 31 provided from the portions 16 to the holes 12 and 13 and gates 30 connecting to the holes 12 and 13 on downstream sides of the passages 31. The method can reduce lead time of a production line without replacing the molding dies for different laminated rotor cores and thus without preparing different types of molding dies.

5 Claims, 9 Drawing Sheets

(58) Field of Classification Search
CPC ........... H02K 2201/09; H02K 2203/03; H02K 2203/06; H02K 2203/12; H02K 2211/03; H02K 29/03; H02K 3/18; H02K 3/28; H02K 3/325; H02K 3/522; H02K 3/524; H02K 5/225; H02K 7/14; H02K 9/22; H02K 11/33; H02K 15/00; H02K 15/03; H02K 15/12; H02K 15/0025; H02K 15/0081; H02K 15/02; H02K 15/022; H02K 15/024; H02K 15/026; H02K 15/04; H02K 1/12; H02K 1/14; H02K 1/143; H02K 1/146; H02K 1/148; H02K 1/16; H02K 1/18; H02K 1/185; H02K 1/20; H02K 1/246; H02K 1/28; H02K 1/276; H02K 1/2766; H02K 1/278; H02K 1/2786; H02K 1/32; H02K 29/08; H02K 5/08; H02K 5/128; H02K 7/1838; H02K 9/00; H02K 9/02; H02K 9/19; B29K 2995/0008; B29K 2105/203; B20C 45/14; B20C 45/14008; B20C 45/14467; B20C 45/14491; B20C 45/14639; B20C 45/14819; B20C 45/27; B20C 45/2703; B20C 45/2708; B20C 45/32; B29L 2031/749; B29L 2031/7496; H01F 7/128; H01F 27/022; H01F 27/327; H01F 41/005; H01F 41/02

See application file for complete search history.

(56) References Cited

U.S. PATENT DOCUMENTS

| | | | |
|---|---|---|---|
| 4,614,022 A | 9/1986 | Bibby et al. | |
| 5,859,486 A | 1/1999 | Nakahara et al. | |
| 5,893,205 A | 4/1999 | McClelland | |
| 5,989,473 A * | 11/1999 | Haverty | B29C 45/14795 264/129 |
| 6,167,610 B1 | 1/2001 | Nakahara et al. | |
| 7,653,984 B2 | 2/2010 | Amano et al. | |
| 7,854,056 B2 | 12/2010 | Watanabe et al. | |
| 7,950,133 B2 * | 5/2011 | Amano et al. | 29/598 |
| 8,020,280 B2 | 9/2011 | Fukumanu et al. | |
| 8,578,592 B2 | 11/2013 | Nagai et al. | |
| 9,564,790 B2 * | 2/2017 | Nagai | H02K 1/2766 |
| 2008/0276446 A1 * | 11/2008 | Amano | B29C 45/02 29/598 |
| 2009/0026867 A1 | 1/2009 | Haruno et al. | |
| 2009/0174273 A1 | 7/2009 | Watanabe et al. | |
| 2010/0026127 A1 | 2/2010 | Mizutani et al. | |
| 2010/0083486 A1 | 4/2010 | Amano et al. | |
| 2011/0000079 A1 | 1/2011 | Fukumaru et al. | |
| 2012/0222289 A1 * | 9/2012 | Nagai et al. | 29/598 |
| 2012/0324719 A1 | 12/2012 | Sasaki et al. | |
| 2013/0162063 A1 | 6/2013 | Sasajima | |
| 2013/0228280 A1 * | 9/2013 | Hirayama et al. | 156/293 |
| 2014/0103574 A1 * | 4/2014 | Ishimatsu | 264/261 |
| 2014/0124980 A1 * | 5/2014 | Nagai et al. | 264/265 |

FOREIGN PATENT DOCUMENTS

| | | |
|---|---|---|
| CN | 101490928 A | 7/2009 |
| JP | 11-262205 A | 9/1999 |
| JP | 2002-34187 A | 1/2002 |
| JP | 2002-247784 A | 8/2002 |
| JP | 2005-287134 A | 10/2005 |
| JP | 3786946 B1 | 6/2006 |
| JP | 2006-197693 A | 7/2006 |
| JP | 2006-211748 A | 8/2006 |
| JP | 2006-238584 A | 9/2006 |
| JP | 2006-345600 A | 12/2006 |
| JP | 2007-068356 A | 3/2007 |
| JP | 2007-215301 A | 8/2007 |
| JP | 2007-318942 A | 12/2007 |
| JP | 2008-36671 A | 2/2008 |
| JP | 2008-042967 A | 2/2008 |
| JP | 2008-54376 | 3/2008 |
| JP | 2008-054376 A | 3/2008 |
| JP | 2008-154436 A | 7/2008 |
| JP | 2008-263722 A | 10/2008 |
| JP | 2009-077547 A | 4/2009 |
| JP | 2009-100634 A | 5/2009 |
| JP | 2009-195011 A | 8/2009 |
| JP | 2009-303485 A | 12/2009 |
| JP | 4414417 B2 | 2/2010 |
| JP | 2010-158164 A | 7/2010 |
| JP | 2010-187535 A | 8/2010 |
| JP | 2010-246266 A | 10/2010 |
| JP | 2011-55687 A | 3/2011 |
| JP | 4688505 B2 | 5/2011 |
| JP | 2012-10572 A | 1/2012 |
| JP | 4991900 B2 | 8/2012 |
| WO | 2006/077998 A1 | 7/2006 |
| WO | 2007/026900 A1 | 3/2007 |
| WO | 2008/007679 A1 | 1/2008 |
| WO | 2011/145399 A1 | 11/2011 |

OTHER PUBLICATIONS

Office Action dated Sep. 30, 2014, issued in corresponding Japanese Patent Application No. 2010-278335 (2 pages).
International Search Report for PCT/JP2011/074972, dated Jan. 13, 2012.
International Search Report for PCT/JP2011/074842, dated Jan. 31, 2012.
Notification of Reasons for Refusal issued by JPO on Japanese Patent application No. 2013-161703.
International Search Report of PCT/JP2011/058452, dated Jun. 28, 2011.
Non-Final Office Action dated Sep. 11, 2014, issued in U.S. Appl. No. 13/885,065. (13 pages).
International Search Report for PCT/JP2011/074972, dated Jan. 13, 2012 (2 pages).
Non-Final Office Action dated Jun. 16, 2015, issued in U.S. Appl. No. 13/885,050 (21 pages).
Ex Parte Quayle dated Feb. 28, 2013, issued in U.S. Appl. No. 13/509,190. (9 pages).
Notice of Allowance dated Aug. 13, 2013, issued in U.S. Appl. No. 13/509,190 (8 pages).
Japanese Office Action dated Sep. 30, 2014, issued in corresponding JP Application No. 2010-272769 (3 pages).
Notice of Allowance dated Sep. 21, 2015, issued in U.S. Appl. No. 13/885,065 (11 pages).
Chinese Office Action dated Oct. 10, 2014, issued in corresponding CN Application No. 201180039235.6 (6 pages).
Final Office Action dated Jan. 4, 2016, issued in U.S. Appl. No. 14/072,241 (7 pages).
Notice of Allowance dated Dec. 17, 2015, issued in U.S. Appl. No. 13/885,050. (9 pages).
Office Action dated Dec. 21, 2015, issued in corresponding U.S. Appl. No. 14/049,770 (21 pages).
Notification of Reasons for Refusal by SIPO on Chinese patent application No. 201310471440.0 dated Oct. 9, 2015; with English translation. (12 pages).
Notification of Reasons for Refusal by SIPO on Chinese patent application No. 201310540651.5 dated Oct. 21, 2015; with English trasnlation. (18 pages).
Notification of Reasons for Refusal dated Mar. 14, 2014, by SIPO on Chinese patent application No. 201210208937.9. (6 pages).
Notification of Reasons for Refusal issued by JPO dated Mar. 10, 2015 on Japanese patent application No. 2011-139741; with English translation. (8 pages).
English translation of Chinese Office Action dated Oct. 10, 2014, issued in corresponding CN Application No. 201180039235.6 submitted on Nov. 2, 2015.
English translation of Japanese Office Action dated Sep. 30, 2014, issued in corresponding JP Application No. 2010-272769 submitted on Nov. 2, 2015.

(56) References Cited

OTHER PUBLICATIONS

English translation of Japanese Office Action dated Aug. 5, 2014, issued in corresponding Japanese Patent Application No. 2012-171366 submitted on Nov. 14, 2014.
English translation of Japanese Office Action dated Sep. 30, 2014, issued in corresponding Japanese Patent Application No. 2010-278335 submitted on Nov. 14, 2014.
English translation of Japanese Office Action dated Sep. 17, 2013 issued by JPO on Japanese Patent Application No. 2013-161703 submitted on Sep. 15, 2015.
Notice of Allowance dated Sep. 26, 2016, issued in U.S. Appl. No. 14/072,241 (11 pages).
Final Office Action dated Jun. 30, 2016, issued in U.S. Appl. No. 14/049,770 (11 pages).
Decision of Patent Grant dated Jul. 15, 2016, issued in Japanese Application No. 2012-227126, with English translation (6 pages).
Second Notice of Reasons for Refusal dated Jun. 22, 2016, issued in Chinese Application No. 201310540651.5, with English translation (10 pages).
Second Notice of Reason for Refusal dated May 30, 2016, issued in Chinese Application No. 201310471440.0, with English translation (9 pages).
Notice of Allowance dated May 10, 2016, issued in U.S. Appl. No. 13/885,065 (16 pages).
Final Office Action dated Jun. 14, 2016, issued in U.S. Appl. No. 14/072,241 (15 pages).
Office Action dated Nov. 22, 2016, issued in counterpart European Application No. 11 846 665.5. (7 pages).

* cited by examiner

FIG. 3(A)
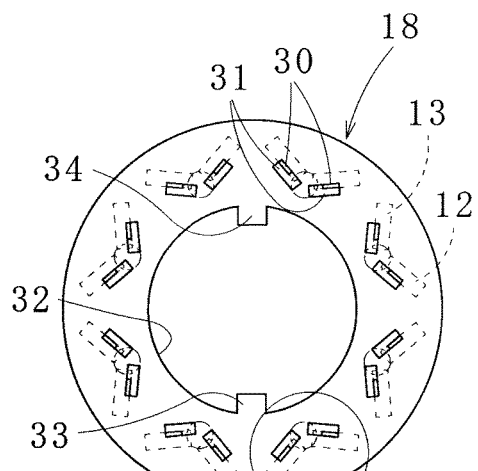
FIG. 3(B)
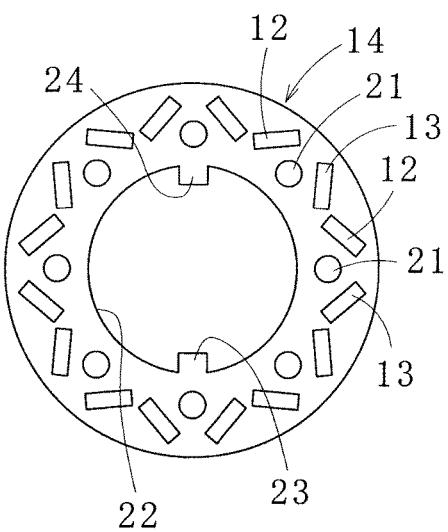
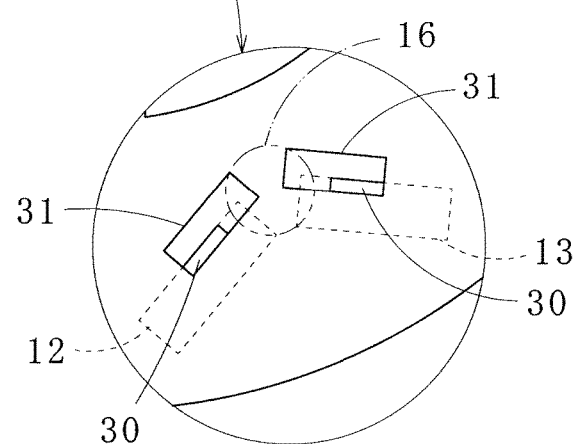

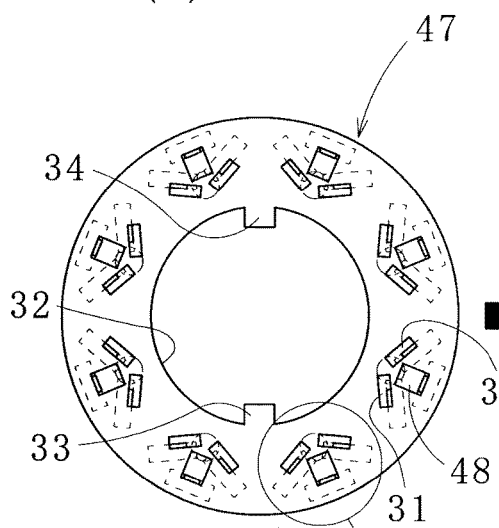
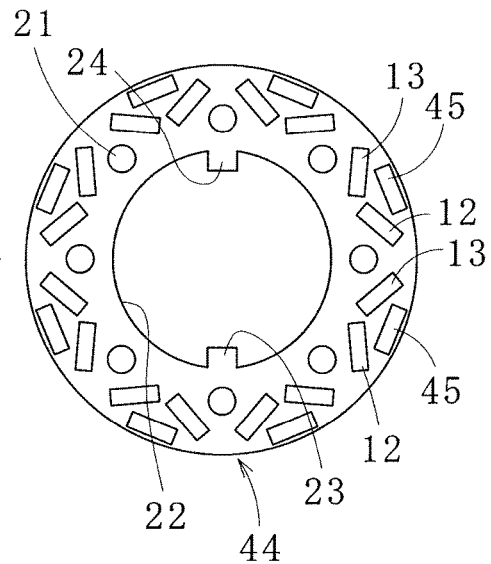
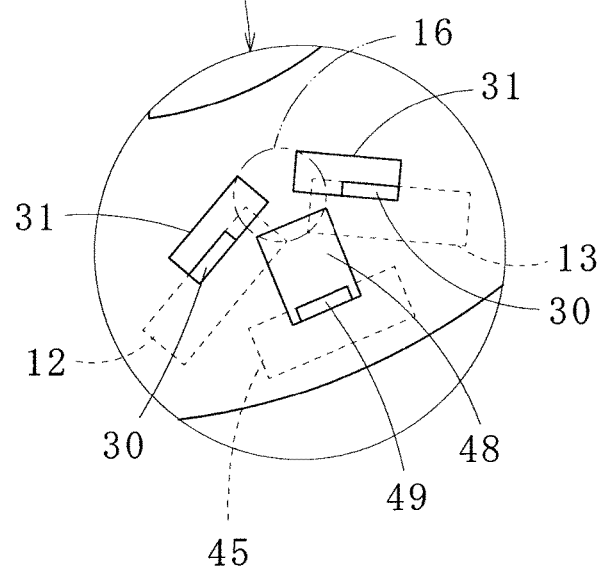

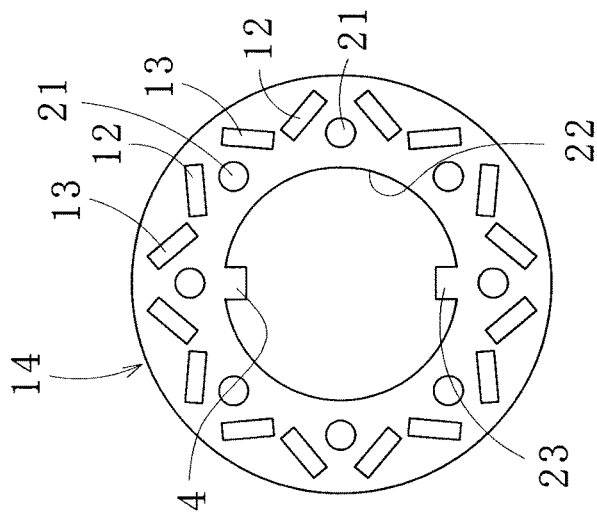
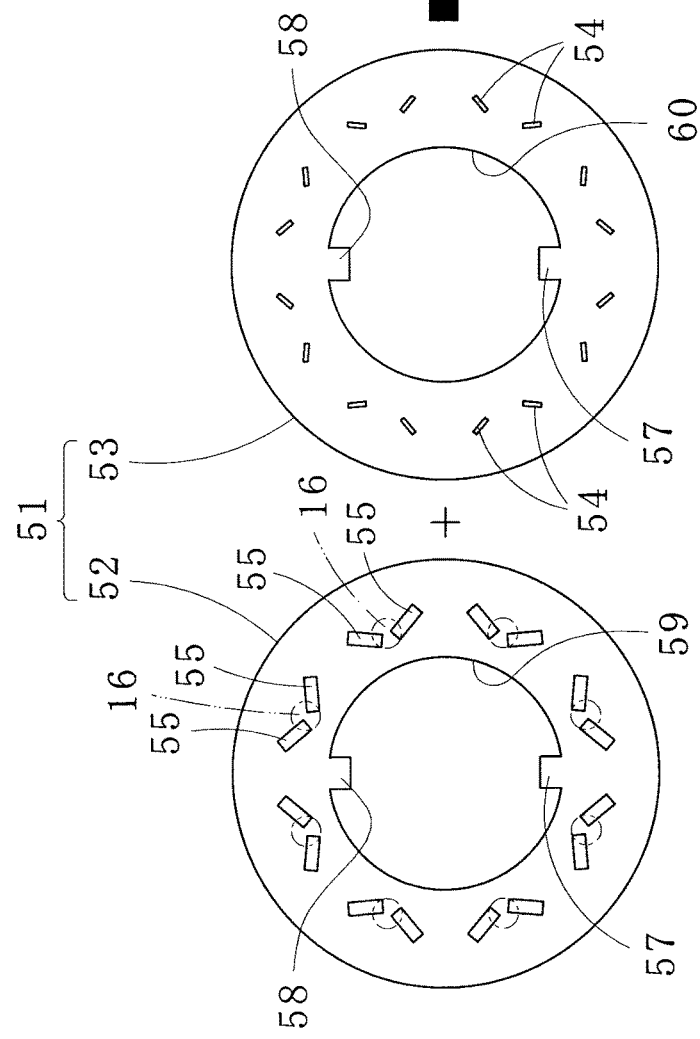
FIG. 6(A)    FIG. 6(B)    FIG. 6(C)

PRIOR ART

PRIOR ART

METHOD OF MANUFACTURING LAMINATED CORE

TECHNICAL FIELD

The present invention relates to a method of manufacturing a laminated core for a motor, the laminated core with a magnet piece resin-sealed in each of a plurality of magnet insertion holes axially-penetrating therethrough.

BACKGROUND ART

Conventionally, as described in Patent Literature 1, a magnet molding method A is known, in which a plurality of magnet insertion holes are provided for a laminated core body of a laminated rotor core, and a magnet piece is inserted and fixed in each of the magnet insertion holes. In this method, as shown in FIG. 8, magnet pieces 72 are inserted in a plurality of magnet insertion holes 71 provided in a radially-outward region of a laminated rotor core 70. After the laminated rotor core 70 is heated to a certain temperature, a molding resin 75 is injected from an upper die 73 (or a lower die 74) into the magnet insertion holes 71. By curing the molding resin 75, the magnet pieces 72 are fixed to a laminated core body 76. A reference numeral 77 denotes a carrier fixture, a reference numeral 78 denotes an upper fixing plate, a reference numeral 79 denotes a lower fixing plate, a reference numeral 80 denotes a guide post, and a reference numeral 81 denotes a plunger.

However, in the method described in Patent Literature 1, the molding resin 75 remains on a resin passage portion of a surface of the laminated rotor core and a gate portion which connects to the magnet insertion hole 71. Therefore, after the molding resin is filled, a process to remove the resin remained on the surface is needed. Thus, Patent Literature 2 discloses a magnet molding method B wherein a dummy plate is used.

In the magnet molding method B, as shown in FIG. 9, a dummy plate 82 is disposed on a top surface of a laminated core body 76. The molding resin 75 is injected through a gate 83, a resin injection hole, provided on the dummy plate 82. Thus, the injected molding resin 75 adheres to and remains on a surface of the dummy plate 82, not on the top surface of the laminated core body 76. Therefore, by removing the dummy plate 82 from the laminated core body 76, the residual molding resin is also removed at the same time. A reference numeral 84 denotes a resin passage provided in the upper die 73.

CITATION LIST

Patent Literature

[Patent Literature 1] Japanese Patent No. 3786946
[Patent Literature 2] Japanese Patent No. 4414417

SUMMARY OF INVENTION

Technical Problem

However, in the magnet molding methods described in Patent Literature 1 and 2, it is necessary to change a shape of a molding die (upper die or lower die) including a resin reservoir portion and a dummy plate according to a given laminated core body whenever the positions or the numbers of the magnet insertion holes of the laminated core body are changed. Therefore, if the molding die is prepared according to a type of a laminated rotor core, manufacturing cost increases. Moreover, in a production line, the molding die must be replaced whenever the type of the laminated rotor core is changed. Accordingly, including adjustment after replacing the molding die, it takes several dozens of minutes to several hours to restart production, resulting in a hindrance to a reduction of production time.

The present invention has been made in view of the above circumstances, and it is an object of the present invention to provide a method of manufacturing a laminated core, which can reduce lead time of the production line without changing the molding die for each different laminated rotor core and thus without preparing another type of molding device.

Solution to Problem

To accomplish the above object, the present invention provides a method of manufacturing a laminated core, the laminated core formed by placing a laminated core body having magnet pieces inserted in magnet insertion holes thereof between a molding die and a retaining die, filling a molding resin from resin reservoir portions of the molding die to the magnet insertion holes, and thereby fixing the magnet pieces in the magnet insertion holes, the method including: placing a guide member between the molding die and the laminated core body, the guide member including: a) groove-type resin passages provided from the resin reservoir portions to the magnet insertion holes; and b) gates on downstream sides of the resin passages, the gates connected to the magnet insertion holes.

Here, if the laminated core body stands vertically, the molding die is disposed at a top or a bottom of the laminated core body. The guide portion is correspondingly disposed at the top or the bottom of the laminated core body.

In the method of manufacturing the laminated core according to the present invention, it is preferable that the guide member be made of one flat plate (e.g., stainless steel plate or steel plate), the resin passage include a groove opened to the molding die, and the gate be a through-hole provided at an end of the resin passage.

Also, in the method of manufacturing the laminated core according to the present invention, it is preferable that the guide member include at least two flat plates (e.g, stainless steel plate or steel plate), and the resin passage be formed by penetrating through one of the flat plates adjoining the molding die. It is further preferable that the gate be formed in another flat plate adjoining the laminated core body, and be a through-hole connected to the downstream side of the resin passage.

In the method of manufacturing the laminated core according to the present invention, it is preferable that when viewed in plan, the gate be smaller than the magnet insertion hole, and overlap with the magnet insertion hole on a radially-inward region thereof. Here, the term "when viewed in plan" means to look at the laminated core body in an axial direction. Accordingly, the resin at where the magnet insertion hole and the gate abut each other can be broken easily, and the unnecessary resin can be removed easily.

In the method of manufacturing the laminated core according to the present invention, it is preferable that the molding die include a plurality of the resin reservoir portions, from which the molding resin be supplied to a plurality of groups of the magnet insertion holes (including one or a plurality of the magnet insertion holes) formed in the laminated core body.

In addition, in the method of manufacturing the laminated core according to the present invention, it is preferable that a diameter of the guide member be larger than a diameter of the laminated core body. Accordingly, the guide member can be easily removed after resin-sealing.

Advantageous Effects of Invention

The method of manufacturing a laminated core according to the present invention has the following effects:
(1) In a production line in operation, even if a type of the product to be molded (i.e., laminated core) is changed during the operation, molding is enabled only by setting a guide member corresponding to the product without replacing a molding die, it is thus possible to manufacture the product continuously without stopping the production line.
(2) Thus, for a specific product type, it is only necessary to replace the guide member as the type of the product is changed, and it is therefore possible to reduce lead time.
(3) It is further possible to significantly reduce costs for dies and production because it is not necessary to manufacture a molding die for each product type.

Specifically, by using at least two flat plates for the guide member, it is possible to prevent the resin from remaining on a surface of the product. Further, by separating the at least two flat plates, the residual resin can be removed very easily.

BRIEF DESCRIPTION OF DRAWINGS

FIG. 3(A) is a plan view showing a guide member used in the method, and FIG. 3(B) is a plan view showing a laminated core manufactured by the method.

FIG. 4(A) is a plan view showing a guide member used in a method of manufacturing a laminated core according to a second embodiment of the present invention, and FIG. 4(B) is a plan view showing a laminated core manufactured by the method.

FIGS. 6(A) and 6(B) are explanatory diagrams showing a guide member used in the method, and FIG. 6(C) is a plan view showing a laminated core manufactured by the method.

DESCRIPTION OF EMBODIMENTS

Figure 1:
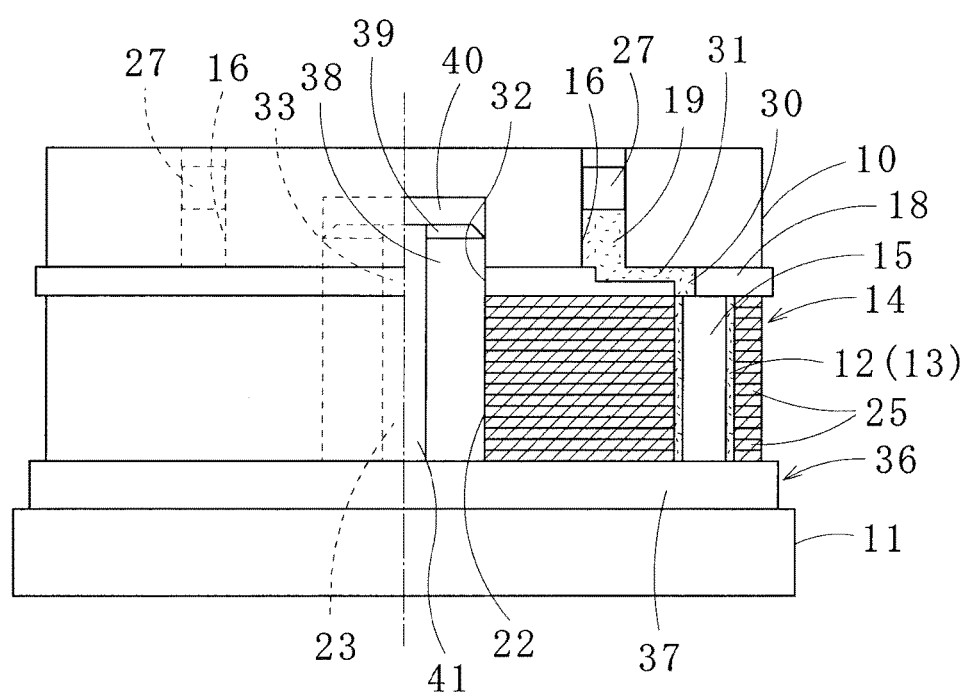
FIG. 1 is an explanatory diagram showing a method of manufacturing a laminated core according to a first embodiment of the present invention.

As shown in FIG. 1, in a method of manufacturing a laminated core according to a first embodiment of the present invention, a laminated core body 14 is placed between an upper die 10, which is an example of a molding die, and a lower die 11, which is an example of a retaining die. The laminated core body 14 has a plurality of pairs of magnet insertion holes 12 and 13 vertically penetrating therethrough (see FIG. 3(B)) in a radially-outward region thereof. The laminated core body 14 is placed with a magnet piece (unexcited permanent magnet) 15 inserted in each of the magnet insertion holes 12 and 13. Further, a molding resin 19 is filled via a guide member 18 into the magnet insertion holes 12 and 13 from resin reservoir pots 16, which are examples of resin reservoir portions formed in the upper die 10, to fix the magnet pieces 15 in the magnet insertion holes 12 and 13. Here, a height of the magnet piece 15 is equal to a height of the laminated core body 14 or smaller than the height of the laminated core body 14 with a slight difference (0.1 to 2 mm).

The laminated core body 14 includes a plurality of pairs (8 pairs in this embodiment) of the paired magnet insertion holes 12 and 13 (which form a group of the magnet insertion holes), and a through-hole 21 as a lightening hole is formed in each radially-inward region between the magnet insertion holes 12 and 13, which are arranged in a chevron shape when viewed in plan. At a center of the laminated core body 14, a shaft hole 22 is formed, and inside the shaft hole 22, projecting portions 23 and 24 (see FIG. 3) are formed. The projecting portions 23 and 24 are rectangular when viewed in plan and are disposed opposite each other. The laminated core body 14 is formed by caulking and laminating core sheets 25, which are pressed from a magnetic metal sheet (e.g., silicon steel plate) and have an identical shape.

As shown in FIG. 3(A), the upper die 10 includes the resin reservoir pots 16 having circular sections at the positions radially inward of the paired magnet insertion holes 13 and 12 in a V-shape when viewed in plan. A liquefied molding resin (thermosetting resin) 19 filled inside each of the resin reservoir pots 16 is extruded to the laminated core body 14 by a plunger 27 moved up and down by an unillustrated cylinder.

The guide member 18 is made of one flat plate (e.g., stainless steel plate or steel plate) with a thickness, for example, of 0.2 to 3 mm. The guide member 18 includes resin passages 31, which are bottomed grooves opened to the upper die 10. Upstream ends of the resin passages 31 are connected to the resin reservoir pots 16, and downstream ends thereof are connected to gates 30, which are through-holes each formed in a radially-inward region of the magnet insertion holes 12 and 13 (shown in dotted lines). A depth of the resin passage 31 is 30 to 70% of a thickness of the guide member 18. The gates 30 formed at the downstream ends of the resin passages 31 are rectangular holes, and are provided at centers of the radially-inward regions of the magnet insertion holes 12 and 13 below the resin passages 31. Here, the gates 30 are not limited to be rectangular holes, but may be circular holes, triangular holes, etc.

A length of a long side of the gate 30 is 0.3-fold to 0.7-fold of a length of a long side of the magnet insertion holes 12 and 13. Also, a length of a short side of the gate 30 is 0.3-fold to 0.7-fold of a length of a short side of the magnet insertion holes 12 and 13.

A diameter of the guide member 18 is larger than a diameter of the laminated core body 14 by 1 to 10%. Inside the guide member 18, a shaft hole 32, which has a diameter identical to a diameter of a shaft hole 22 of the laminated core body 14, is provided. Inside the shaft hole 32, projecting portions 33 and 34, which are identical to projecting portions 23 and 24 provided inside the shaft hole 22, are provided.

In this embodiment, the laminated core body 14 is mounted on a carrier fixture 36, and positioned and held between the lower die 11 and the upper die 10.

Figure 2:
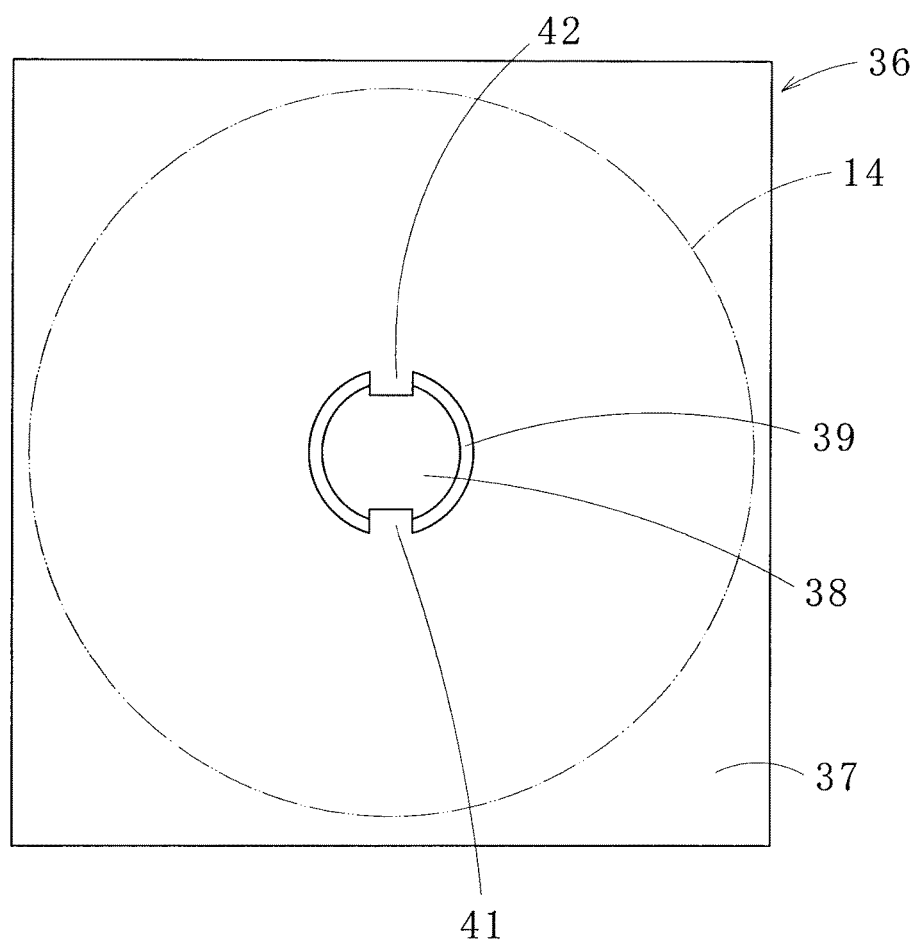
FIG. 2 is a plan view showing a carrier fixture used in the method.

As shown in FIG. 2, the carrier fixture 36 includes a mounting portion 37 and a guide shaft 38 disposed at a center thereof. A length of the guide shaft 38 is longer than a height of the laminated core body 14, and a chamfer 39 is formed at an upper end of the guide shaft 38. The upper die 10 includes a hole 40 into which the guide shaft 38 is inserted. At both sides in a radial direction of the guide shaft 38, key slots 41 and 42 are provided, into which the projecting portions 23, 24, 33, and 34 are inserted in close contact therewith. Alternatively, key slots may be formed in an outer circumference of a shaft hole of a laminated core, and projecting portions, which are inserted into the key slots, may be provided on a guide shaft.

Hereinafter, a method of manufacturing a laminated core using a resin sealing apparatus constituted as described above will be described.

After the guide member 18 is stacked on the laminated core body 14 preheated and mounted on the carrier fixture 36, they are together placed between the upper die 10 and the lower die 11. The laminated core body 14 and the guide member 18 are positioned by lowering the upper die 10 to insert the guide shaft 38 of the carrier fixture 36 into the hole 40 of the upper die 10.

Here, the plungers 27 are pushed down by the unillustrated cylinders to extrude the liquefied molding resin 19 in the resin reservoir pots 16 downward. The molding resin 19 is filled in each of the magnet insertion holes 12 and 13 from the resin passage 31 via the gate 30. Since the gates 30 are provided in a way that they overlap radially-inward regions of the magnet insertion holes 12 and 13, the magnet pieces 15 are pushed to radially-outward regions of the magnet insertion holes 12 and 13.

Since the molding resin 19 is a thermosetting resin, it is heated and cured by the preheated laminated core body 14. The upper die 10 is then lifted and the guide member 18 is removed from the laminated core body 14, and the cured molding resin 19 is broken at or near the gates 30. This procedure can be performed on the lower die 11. Alternatively, this procedure can be performed after the carrier fixture 36 is moved to another place.

Next, by referring to FIGS. 4(A) and 4(B), a method of manufacturing a laminated core according to a second embodiment of the present invention will be described only for parts different from the method according to the first embodiment of the present invention. The upper die 10, the lower die 11, and the carrier fixture 36, which are the same as those described in the first embodiment of the present invention, are used. In a laminated core body 44, magnet insertion holes 45 are provided in addition to the magnet insertion holes 12 and 13, forming eight groups of the magnet insertion holes. Therefore, in a guide member 47 to be mounted on the laminated core body 44, resin passages 48 and gates 49 corresponding to the magnet insertion holes 45 are provided.

Detailed descriptions of procedures for the method of manufacturing the laminated core according to the second embodiment are omitted because the procedures are the same as those of the method of manufacturing the laminated core according to the first embodiment.

In these embodiments, the resin is filled from one resin reservoir pot to two or three magnet insertion holes. Further, the present invention is applicable to a case where the resin is filled from one resin reservoir pot to one magnet insertion hole or to four or more magnet insertion holes.

Figure 5:
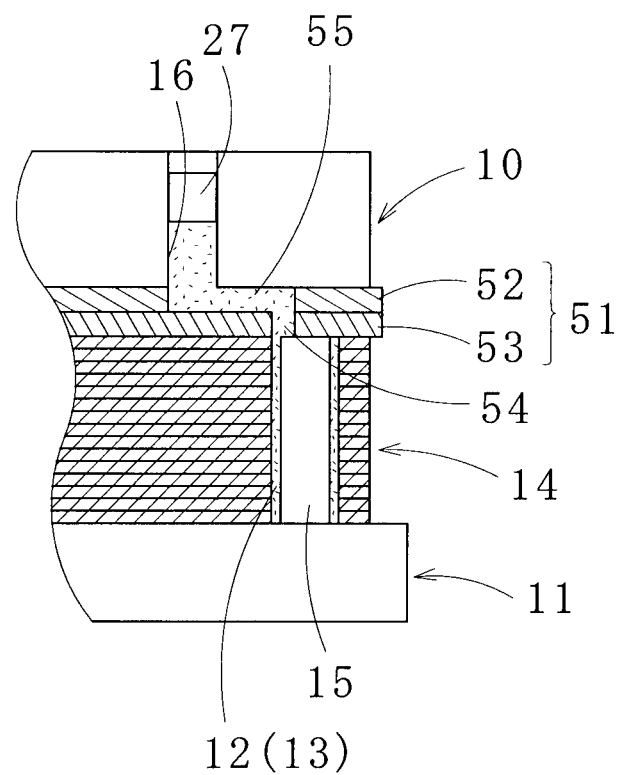
FIG. 5 is an explanatory diagram showing a method of manufacturing a laminated core according to a third embodiment of the present invention.

Next, by referring to FIGS. 5 and 6, a method of manufacturing a laminated core according to a third embodiment of the present invention will be described. Hereunder, detailed descriptions of an upper die and a lower die will be omitted because they are the same as those used in the method of manufacturing the laminated core according to the first embodiment. Also, although a carrier fixture for a laminated core body is omitted (not used) in the third embodiment, it is preferable to use the carrier fixture as described in the first embodiment. In addition, elements which are the same as those in the above-mentioned embodiments are numbered accordingly, and repetitive descriptions of the elements will be omitted (likewise in a fourth embodiment of the present invention).

As shown in FIG. 5 and FIGS. 6(A) to 6(C), the laminated core body 14 with a guide member 51 mounted thereon is placed between the upper die 10 and the lower die 11. In the laminated core body 14, the magnet insertion holes 12 and 13 are provided as described above. In this embodiment, the guide member 51 includes two annular flat plates 52 and 53 made of stainless-steel, and a thickness of each of the flat plates 52 and 53 is, for example, 0.2 to 2 mm. The flat plate 52 adjoining the resin reservoir pots 16 includes resin passages 55, each formed from the resin reservoir pot 16 to a gate 54 on a downstream side of the resin passage 55. The flat plate 53 adjoining the laminated core body 14 includes the gates 54, through which the resin is filled into the magnet insertion holes 12 and 13 formed in the laminated core body 14.

The resin passage 55 is formed by vertically penetrating through the flat plate 52, and the gate 54 is formed by vertically penetrating (as a through-hole) through the flat plate 53. The gate 54 is provided at a radially-inward center of each of the magnet insertion holes 12 and 13 when viewed in plan. The upstream side of the resin passage 55 is connected to the resin reservoir pot 16, and the downstream side thereof is connected to the gate 54. Accordingly, the two flat plates 52 and 53 are integral with each other, working in the same way as the guide member 18 provided with the resin passages 31 and the gates 30 in the first embodiment. Here, diameters of the flat plates 52 and 53 are larger than a diameter of the laminated core body 14, thus the flat plates 52 and 53 can be removed easily.

The guide member 51 is used in the same way as described in the first embodiment. By removing the guide member 51, which means removing the flat plates 52 and 53 simultaneously, and further by separating the flat plates 52 and 53, the molding resin remained in the resin passage 55 can be easily removed.

In addition, it is preferable to use the carrier fixture 36 (not shown in FIG. 5), but if a positioning means (e.g., recessed portion and projecting portion) to position the guide member 51 and the laminated core body 14 is provided, the carrier fixture can be omitted. In FIGS. 6(A) and 6(B), reference numerals 57 and 58 denote projecting portions and reference numerals 59 and 60 denote shaft holes.

Figures 7A, 7B, 7C:
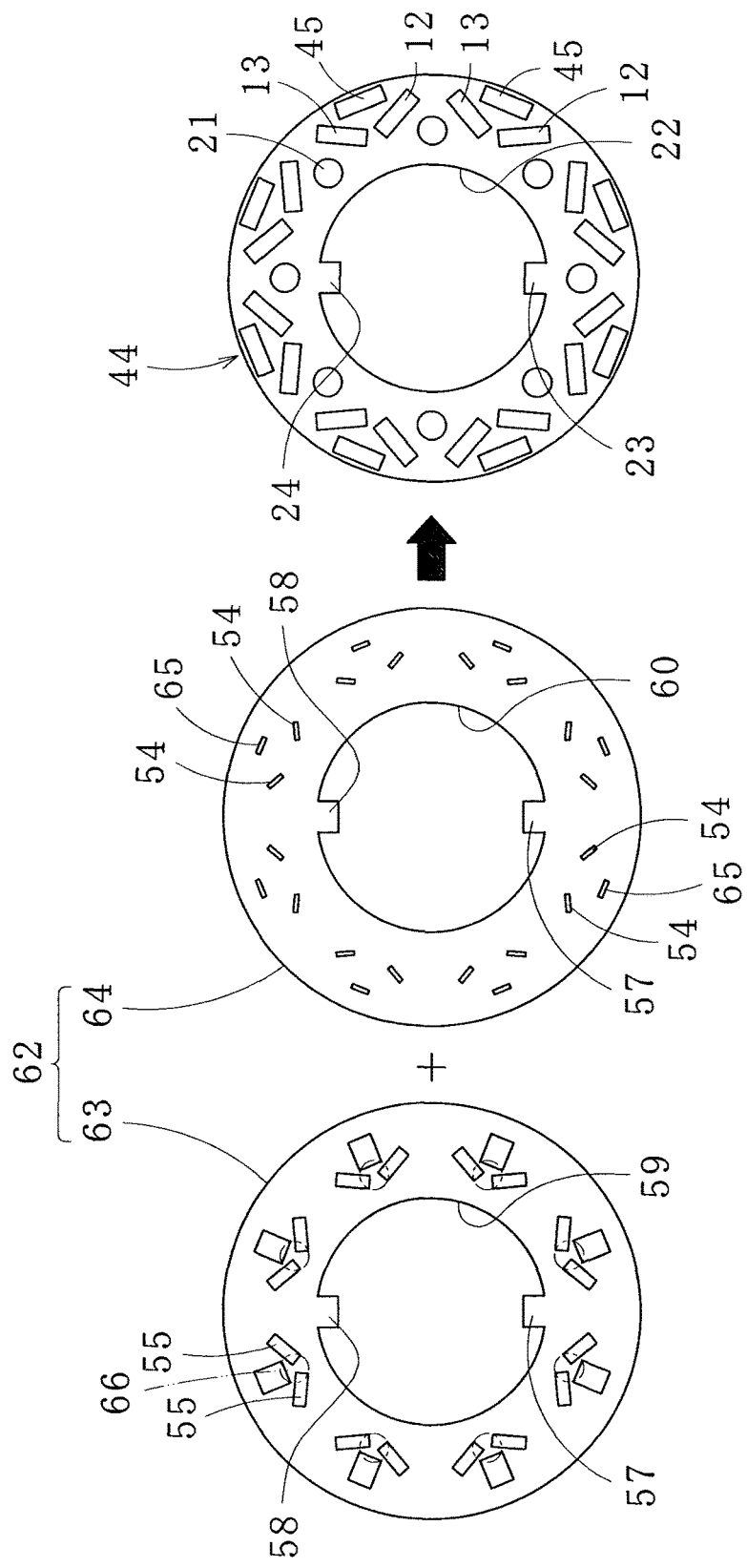
FIGS. 7(A) and 7(B) are plan views showing a guide member used in a method of manufacturing a laminated core according to a fourth embodiment of the present invention.
FIG. 7(C) is a plan view showing a laminated core manufactured by the method.
Figure 8:
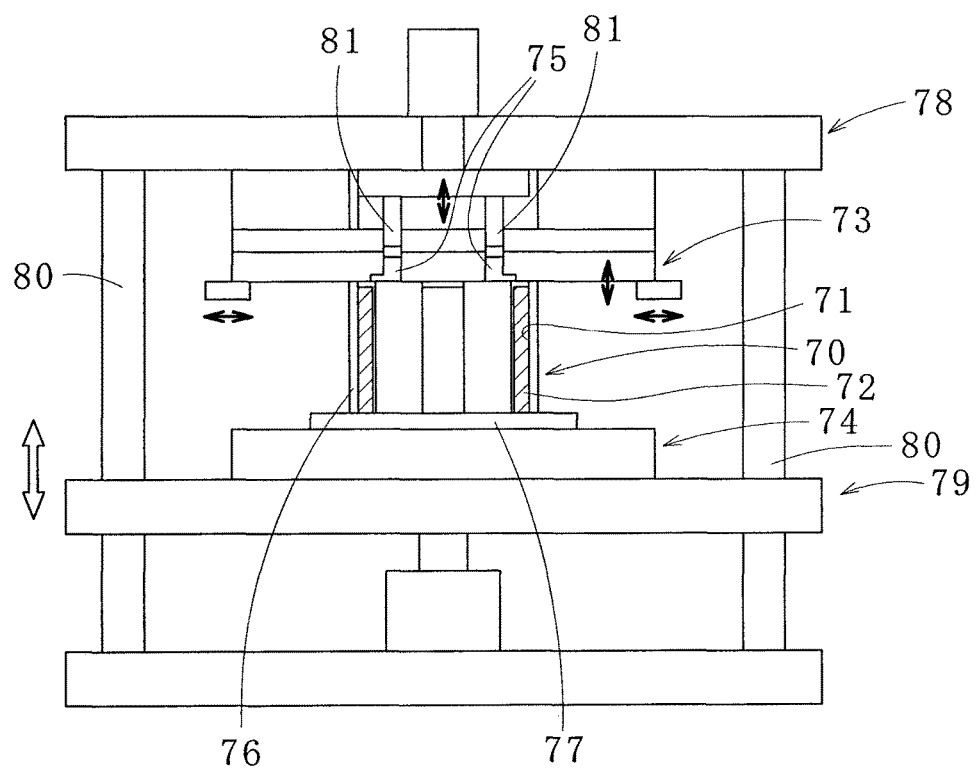
FIG. 8 is an explanatory diagram showing a method of manufacturing a laminated core according to a conventional example.
Figure 9:
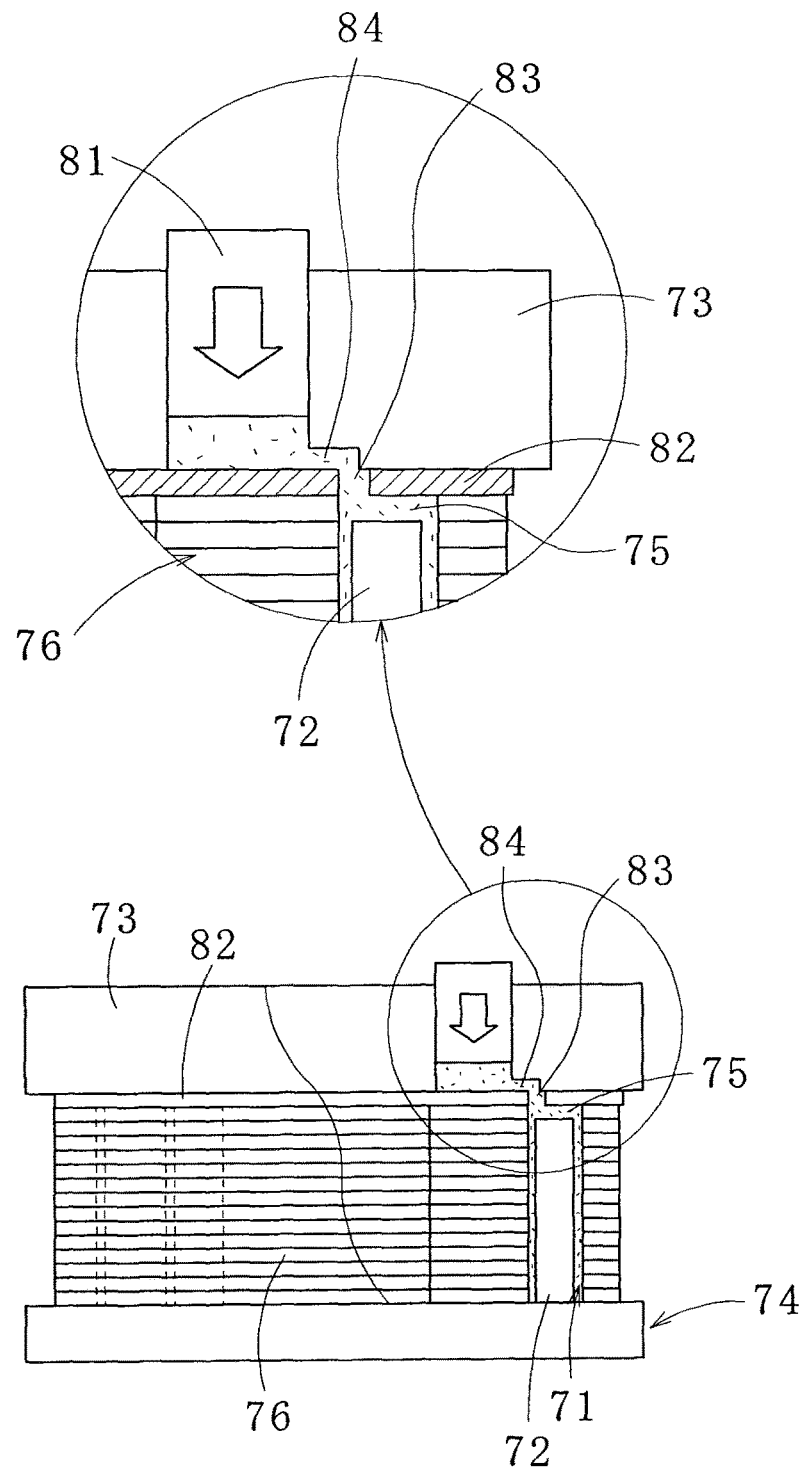
FIG. 9 is an explanatory diagram showing a method of manufacturing a laminated core according to a conventional example.

Next, by referring to FIGS. 7(A) to 7(C), a method of manufacturing a laminated core according to a fourth embodiment of the present invention will be described. In this embodiment, the laminated core body 44 used in the second embodiment of the present invention is used. In the fourth embodiment of the present invention, two flat plates 63 and 64 are used to form a guide member 62. In the flat plate 63, the resin passages 55 and 66 are provided. The resin passages 55 and 66 are connected from the resin reservoir pots provided in the upper die to the gates 54 and 65 on downstream sides. In the flat plate 64, the gates 54 and 65 are provided. The gates 54 and 65 are located at radially-inward centers of the magnet insertion holes 12, 13, and 45 of the laminated core body 44.

The predetermined magnet pieces 15 are inserted in the magnet insertion holes 12, 13, and 45, and the guide member 62 is positioned and mounted on the laminated core body 44. The laminated core body 44 and the guide member 62 are then held together by the upper die and the lower die. After that, the molding resin is filled from the resin reservoir pots to the magnet insertion holes 12, 13, and 45 via the resin passages 55 and 66 and the gates 54 and 65. Accordingly, the magnet pieces 15 are fixed in the magnet insertion holes 12, 13, and 45. When the guide member 62 is removed, the molding resin is removed without remaining on the laminated core body 44.

As described above, by manufacturing the guide members 18, 47, 51, and 62 in accordance with a shape of the laminated core body, it is not necessary to modify a shape of the molding die, thus manufacturing cost for the molding die can be reduced.
In addition, since the guide members 18, 47, 51, and 62 are replaceable in accordance with the shape of the laminated core body, the device (resin sealing apparatus) can be easily changed even when the shape of the laminated core body is changed.

Furthermore, if the guide member includes two or more flat plates, it may be sufficient that only one of the flat plates is replaced in accordance with the shape of the laminated core body.

In the above embodiments, the resin reservoir pots are provided in the upper die, but the resin reservoir pots can also be provided in the lower die to fill the molding resin from below to each of the magnet insertion holes.
Moreover, although specific dimensions are shown in descriptions of the above embodiments, it is possible to change the values of the specific dimensions without departing from the scope of the present invention.
Furthermore, although the method of manufacturing the laminated core according to the present invention is described by referring to the first to fourth embodiments above, a part or all of the above embodiments can be combined to constitute the present invention.

REFERENCE SIGNS LIST

10: upper die, 11: lower die, 12, 13: magnet insertion hole, 14: laminated core body, 15: magnet piece, 16: resin reservoir pot, 18: guide member, 19: molding resin, 21: through-hole, 22: shaft hole, 23, 24: projecting portion, 25: core sheet, 27: plunger, 30: gate, 31: resin passage, 32: shaft hole, 33, 34: projecting portion, 36: carrier fixture, 37: mounting portion, 38: guide shaft, 39: chamfer, 40: hole, 41, 42: key slot, 44: laminated core body, 45: magnet insertion hole, 47: guide member, 48: resin passage, 49: gate, 51: guide member, 52, 53: flat plate, 54: gate, 55: resin passage, 57: projecting portion, 58: projecting portion, 59: shaft hole, 60: shaft hole, 62: guide member, 63, 64: flat plate, 65: gate, 66: resin passage

The invention claimed is:

1. A method of manufacturing a laminated core, the laminated core formed by placing a laminated core body having magnet pieces inserted in magnet insertion holes of the laminated core body between a molding die and a retaining die, filling a molding resin from resin reservoir portions of the molding die to the magnet insertion holes, and thereby fixing the magnet pieces in the magnet insertion holes, the method comprising:
   placing a guide member between the molding die and the laminated core body, the guide member comprising:
   a) grooves which are opened to the molding die, and form resin passages in conjunction with the molding die, the resin passage being entirely opened to the molding die from the resin reservoir portions to gates; and
   b) the gates, which are provided on downstream sides of the grooves, the gates being through holes which are connected to the magnet insertion holes,
   wherein the guide member is made of one flat plate;
   wherein the gate is smaller than the magnet insertion hole when viewed in plan; and
   wherein the gate is located inside the resin passage when viewed in plan.

2. The method as defined in claim 1, wherein the gate overlaps with the magnet insertion hole on a radially-inward side of the magnet insertion hole.

3. The method as defined in claim 1, wherein the molding die comprises a plurality of the resin reservoir portions, and the molding resin is supplied from the resin reservoir portions to a plurality of groups of the magnet insertion holes formed in the laminated core body.

4. The method as defined in claim 1, wherein a diameter of the guide member is larger than a diameter of the laminated core body.

5. The method as defined in claim 2, wherein a diameter of the guide member is larger than a diameter of the laminated core body.

* * * * *